(12) United States Patent
Zider et al.

(10) Patent No.: US 8,465,150 B2
(45) Date of Patent: Jun. 18, 2013

(54) EYEGLASSES

(75) Inventors: Robert B Zider, Portola Valley, CA (US); John F. Krumme, Woodside, CA (US); Brian A. Thompson, Byron, CA (US)

(73) Assignee: The Beta Group LLC, Palo Alto, CA (US)

( * ) Notice: Subject to any disclaimer, the term of this patent is extended or adjusted under 35 U.S.C. 154(b) by 189 days.

(21) Appl. No.: 12/998,271

(22) PCT Filed: Sep. 18, 2009

(86) PCT No.: PCT/US2009/005202
§ 371 (c)(1),
(2), (4) Date: Apr. 4, 2011

(87) PCT Pub. No.: WO2010/039176
PCT Pub. Date: Apr. 8, 2010

(65) Prior Publication Data
US 2011/0187987 A1   Aug. 4, 2011

Related U.S. Application Data

(60) Provisional application No. 61/195,270, filed on Oct. 3, 2008.

(51) Int. Cl.
*G02C 1/02* (2006.01)
(52) U.S. Cl.
USPC .......................................................... 351/110
(58) Field of Classification Search
USPC ..................... 351/110, 116, 124, 140, 158, 41
See application file for complete search history.

(56) References Cited

U.S. PATENT DOCUMENTS

| | | | |
|---|---|---|---|
| 2,851,925 | A | 9/1958 | Cretin-Martenaz |
| 3,824,006 | A | 7/1974 | Voit |
| 4,895,438 | A | 1/1990 | Zider |
| 4,896,955 | A | 1/1990 | Zider |
| 5,452,028 | A | 9/1995 | Iijima |
| 5,640,217 | A | 6/1997 | Hautcoeur |
| 5,805,259 | A | 9/1998 | Chao |
| 5,861,933 | A | 1/1999 | Bac |
| 6,164,775 | A | 12/2000 | Zider |

(Continued)

FOREIGN PATENT DOCUMENTS

| | | |
|---|---|---|
| DE | 212187 | 7/1909 |
| DE | 213310 | 9/1909 |

(Continued)

OTHER PUBLICATIONS

The Korean Patent Office Search Report and Opinion for PCT/US 2009/005202.

*Primary Examiner* — Hung Dang
(74) *Attorney, Agent, or Firm* — T. H. P. Richardson

(57) ABSTRACT

An eyeglass assembly comprising a frame member comprising a tubular terminal portion (2), and eyeglass lens (11) having an engaging portion (112) to which the frame member is fitted, and a composition (219) which (i) provides at least part of an interface between the engaging portion and the frame member and (ii) extends at least part way into a passage (215, 115) which passes from the interface to an exposed face of the frame member or of the lens. The composition can be a UV-cured adhesive which can be weakened by heat so that the assembly can be easily disassembled.

10 Claims, 2 Drawing Sheets

U.S. PATENT DOCUMENTS

| | | |
|---|---|---|
| 6,250,755 B1 | 6/2001 | Conner |
| 6,394,599 B1 | 5/2002 | Blanvillain |
| 6,523,952 B1 | 2/2003 | Krumme |
| 6,752,893 B2 | 6/2004 | Frieder |
| 6,805,441 B1 | 10/2004 | Loniak |
| 6,827,439 B1 | 12/2004 | Chen |
| 6,843,561 B2 | 1/2005 | Krumme |
| 7,066,594 B2 | 6/2006 | Loniak |
| 7,472,990 B2 * | 1/2009 | Chen ............... 351/110 |
| 8,322,849 B2 * | 12/2012 | Krumme et al. ........ 351/110 |
| 2005/0139309 A1 | 6/2005 | Savoie |
| 2005/0157253 A1 | 7/2005 | Thiele |
| 2005/0253999 A1 | 11/2005 | Lermer |
| 2006/0082722 A1 | 4/2006 | Rapp |
| 2006/0139565 A1 | 6/2006 | Jannard |
| 2006/0250570 A1 | 11/2006 | Friedman |
| 2007/0091255 A1 | 4/2007 | Pilat |
| 2010/0290000 A1 | 11/2010 | Krumme |

FOREIGN PATENT DOCUMENTS

| | | |
|---|---|---|
| DE | U 9406002.9 | 10/1994 |
| DE | 10320270 | 7/2004 |
| EP | 0790519 | 8/1997 |
| FR | 2749088 | 11/1997 |
| FR | 2766586 | 1/1999 |
| WO | WO 00/26715 | 5/2000 |
| WO | WO 02/095482 | 11/2002 |

* cited by examiner

EYEGLASSES

CROSS-REFERENCE TO RELATED APPLICATION

This application is an application under 35 USC 371 based on PCT/US 2009/005202 and claims priority from United States Provisional Application 61/195,270, filed Oct. 3, 2008. The entire disclosure of that application is incorporated herein by reference for all purposes.

BACKGROUND OF THE INVENTION

1. Field of the Invention

This invention relates to eyeglass frames.

2. Introduction to the Invention

Conventional eyeglasses include a bridge member which rests on the nose of the wearer; two rims which are secured to the bridge member and to which the lenses are secured; and two temple members which are secured to the rims and rest on the ears of the wearer. In many cases, each rim has an opening therein, so that the lens can be placed within the rim, after which the open ends of the rim are secured together by means of a screw which passes freely through an aperture in a lug in one of the open ends into a threaded recess in a corresponding lug in the other open end.

U.S. Pat. No. 6,164,775 discloses an improved system for attaching optical frames and lenses which provides positive, reversible attachment without rims, cords or screws. In that system, an eyeglass lens including at least one shaped engaging portion cooperates with an attachment member so that the lens is removably attached to an eyeglass frame. The attachment member can comprise a separate member which is connected or connectable to the eyeglass frame, or it can be an integral part of the eyeglass frame.

International Publication 2007044221 and the corresponding copending US national phase application disclose (1) that, in an eyeglass assembly, an engaging portion on an eyeglass lens can be maintained in contact with an eyeglass frame member by means of a removable bonding member (RBM) which
   (a) contacts the engaging portion and the frame member; and
   (b) under typical conditions of use of the assembly, maintains the engaging portion and the frame member in direct or indirect contact with each other; and
   (c) under selected atypical ambient conditions, undergoes a change which separates the engaging portion and the frame member, or permits the engaging portion and the frame member to be separated from each other by pulling them apart manually.

The term "selected atypical ambient conditions" is used to denote any condition which
   (i) is not present during the typical conditions of use of the eyeglass assembly,
   (ii) when applied to the RBM, causes the RBM to undergo a change which permits the engaging portion and the frame member to be separated from each other by pulling them apart manually, or which causes the engaging portion and the frame member to separate from each other, and
   (iii) does not involve the use of external mechanical force to change the physical configuration of the RBM, the engaging portion or the frame member, e.g. does not involve the turning of a screw or the mechanical opening of a latch.

The selected atypical ambient conditions preferably do not have any adverse effect on at, least one of the eyeglass lens and the frame member. The RBM can for example comprise (1) an adhesive which lies between and contacts the engaging portion and the frame member, and whose adhesive strength is reduced by the selected atypical ambient conditions; such an adhesive is referred to herein as a removable bonding adhesive (often hereinafter abbreviated to RBA); and/or (2) a member comprising a component which comprises a shape memory alloy (SMA) and which changes shape when exposed to the selected atypical ambient conditions; such a member is referred to herein as an RBSMA; and/or (3) a member comprising a component which melts, or whose physical strength is otherwise reduced, under the selected atypical ambient conditions; such a member is referred to herein as an RBS; an RBS can for example comprise a component composed of a solder or other composition which melts when heated.

U.S. Pat. Nos. 4,895,438, 4,896,955, 6,523,952 and 6,843,561 disclose improved eyeglass frames, some of which make use of a member composed of a shape-memory alloy (often hereinafter abbreviated to SMA) and/or a lens including a shaped engaging portion.

The entire disclosure of each of the U.S. patents, the international publication and the corresponding US national phase application referred to above is incorporated herein by reference for all purposes.

SUMMARY OF THE INVENTION

We have discovered, in accordance with the present invention, that when contacting surfaces of (i) an engaging portion on an eyeglass lens and (ii) an eyeglass frame member are to be maintained in contact, improved results can be obtained by (A) providing (i) a passage which passes away from the contacting surface of the frame member, preferably to an exterior surface of the frame member, and/or (ii) a passage which passes away from the contacting surface of the engaging portion, preferably to an exterior surface of the engaging portion, (B) coating at least part of the contacting surfaces of one or both of the engaging portion of the lens and the frame member with a composition which is relatively soft when the contacting surfaces of the lens and the frame member are brought into contact, (C) bringing the contacting surfaces into contact in such a way that the composition is forced into the passage, (D) treating the composition so that it hardens (the treatment being for example exposure to ultraviolet or other radiation, or simply leaving the composition to harden at ambient temperature and pressure), thus providing a physical lock which helps to secure the lens and the frame member together.

The invention includes assemblies comprising an eyeglass lens and a frame member in which a composition provides at least part of the interface between the lens and the frame member and extends at least part way into a passage which passes from the interface to an exposed face of the frame member or of the lens.

The invention also includes kits of parts which comprise an eyeglass lens having an engaging portion and a frame member which can be fitted to the engaging portion, at least one of the eyeglass lens and the frame member including a passage which, when the frame member is fitted to the engaging portion, passes from the interface to an exposed face of the frame member or of the lens The invention also includes an eyeglass lens having an engaging portion which lies within the thickness of the lens and a passage which passes from the engaging portion to an exposed face of the lens.

The invention also includes a frame member which includes a passage which, when the frame member is fitted to the engaging portion of a lens, passes from the interface to an exposed face of the frame member.

BRIEF DESCRIPTION OF THE DRAWINGS

The invention is illustrated in the accompanying drawings which are diagrammatic and not to scale, and in which.

DETAILED DESCRIPTION OF THE INVENTION

Figure 1:
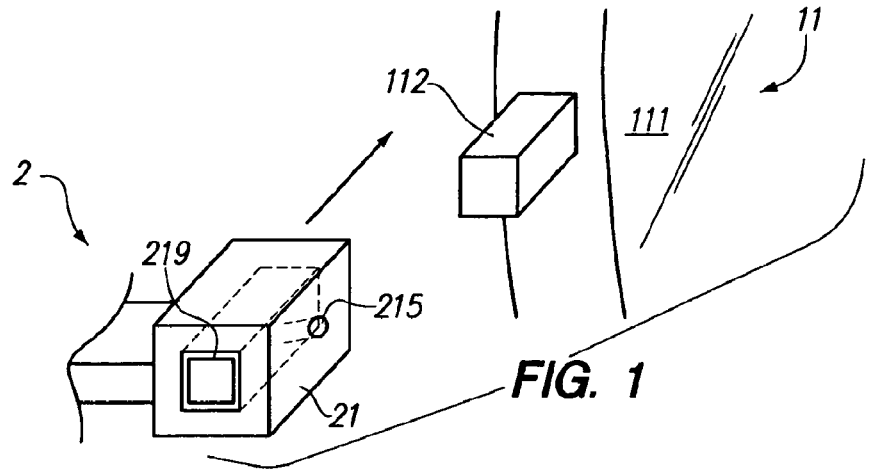
FIGS. 1 and 6 are partial perspective drawings of a lens having an engaging portion to which a frame member is being fitted.

In the Summary of the Invention above, the Detailed Description of the Invention below, and the accompanying drawings, reference is made to particular aspects and features (including for example components, ingredients, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. For example, in any of the first, second, third, and fourth aspects of the invention, the shock-absorbing component can comprise first and second components as described in the fifth or sixth aspect of the invention. The invention disclosed herein includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

In this specification, parts and percentages are by weight, except where otherwise noted. Temperatures are in degrees Centigrade (° C.).

This specification incorporates by reference all documents referred to herein and all documents filed concurrently with this specification or filed previously in connection with this application, including but not limited to such documents which are open to public inspection with this specification.

The composition at the interface between the engaging portion and the frame member can for example be a composition which can later be treated so that it no longer provides a physical lock, for example a removable bonding adhesive (RBA) as described above, thus facilitating the later separation of the lens and the frame member if that should be desirable.

The passage must permit the composition to be forced at least part way into the passage when the contacting surfaces are brought into contact. In this way, the composition can form a plug which protrudes at least part way into the passage, for example substantially fills the passage. Preferably the passage extends from the contacting surface to an opposite surface. The passage can be straight or comprise two or more straight sections at an angle to each other, and/or comprise one or more regularly or irregularly curved sections. The passage can have a constant cross-section or comprise two or more sections have different cross-sections, for example a relatively large area cross-section near the contacting surface and a relatively small area cross-section remote from the contacting surface. At least the portion of the passage adjacent to the contacting surface is preferably at an angle of at least 45°, e.g. 70-90°, particularly 90°, to the contacting surface.

In some embodiments of the invention, the frame member comprises a generally tubular component (the term tubular being used to include not only a component defining a space having closed cross-section, e.g. a round or rectangular (including square) cross-section, but also a component defining a space having a hollow but open cross-section, e.g. a part of, preferably at least half of, for example at least three quarters of, a round or rectangular cross-section). The tubular component can be contacted with the engaging portion of the lens by sliding the two into contact and/or by snapping the tubular component over the engaging portion. When such a tubular component is used, the passage can for example be a straight passage which extends from the inside surface to the outside surface of the component, preferably substantially at right angles to the contacting surface of the tubular component.

In a modification of this invention, alternatively or additionally to the use of a hardenable composition as described above, a separate member, e.g. a rod or tube, which can be composed for example of a metal, e.g. brass, or a polymeric composition, is inserted, after the frame member and the lens have been placed in contact, through a passage through the frame member and into a recess in the lens, to provide a mechanical lock between the frame member and the lens. The separate member can be coated with a suitable liquid composition, e.g. a reversible bonding adhesive, which hardens, or is treated, e.g. with ultraviolet or other radiation, to harden it, after it has been put in place. The separate member is preferably not a screw or other member which places stress on the frame member or the lens while, and/or after, it is inserted.

U.S. Pat. No. 6,164,775 (Zider, et al) and International Patent Application PCT/US 2006/037433, filed Sep. 26, 2006, published as WO 2007/044221 and claiming priority from U.S. App. Nos. 60/724,186 filed Oct. 6, 2005 and 60/817,228 filed Jun. 27, 2006, describe eyeglass lenses being attached to an eyeglass frame without the use of screws, wires or rims. In one embodiment, the eyeglass frame comprises a tube which fits over a lens tab (an engaging portion) and is bonded to a bonding agent activated by UV light. In some embodiments, the bonding agent can be weakened by heat, and this permits not only a controlled assembly process (the bonding agent does not set until the UV light is applied), but also removability (in case the lens becomes scratched or a frame part breaks) by applying heat.

It has been found that, in some cases, there is inadequate adhesion between the frame member and the engaging portion, apparently because the surface of the metal frame is unsatisfactory or because mishandling of the lens or the frame parts contaminates some of the contacting surfaces, e.g. by leaving finger grease on the tabs. One apparent "fix" for this problem is to drill a hole in the tube portion of the frame member and put a screw through the hole into the tab. However, this fix has two problems. First, screws often back out and fail (one estimate has 60 million screws being replaced each year in eyeglasses in the US alone). The second is that the screw action itself sets up tiny stress fractures which, over time, will result in failure of the tab itself. Thus, if the screw is too loose, it will come out, and if it is too tight, or even if it is correctly fitted, it will fracture the tab, thereby ruining the lens.

The present invention, in one embodiment, makes use of a hole drilled in the tube. The lens and frame are then assembled as before, with the bonding agent being put on the tab and/or in the tube. The fitting of the frame member over the lens tab forces the bonding agent into the hole, thus forming a plug which, when activated by UV, will set and provide significant resistance against each pull out forces. Alternatively or additionally, additional bonding agent can be added prior to the UV activation directly into the drill hole.

In one embodiment, further strengthening can be obtained by drilling into the tab, after the frame and lens have been assembled, through the drill hole in the tube. A second bonding agent, either the same used for the tab, or preferably a bonding agent having a substantially higher durometer hardness, is then applied into the hole in the tab and the hole in the tube. Once cured with UV, it provides a very stiff plug to further resist loosening. Again, the second bonding agent can preferably be weakened through application of heat.

In another embodiment, further strengthening can be obtained through the use of separate metal or polymer rods or tubes, inserted through the tube drill hole into the drilled hole in the tab. For example, a brass plug coated with a second bonding agent can be inserted. Such rods might require to be removed by drilling, followed by applying heat and separating the frame and lens.

In another aspect of the invention, in addition to or in place of the use of a passage into which the adhesive is forced, adhesion between the frame member and the engaging portion is enhanced by coating at least part of one or both of the contacting surfaces of the frame member and the engaging portion with a low viscosity "primer" bonding agent which can be activated in any kind of way, including UV light. The conventional UV bonding agent is then applied to the tab and/or the frame member.

Description of the Drawings

Figure 2A:
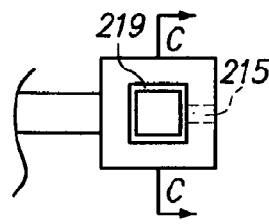
FIGS. 2A, 2B and 2C, FIGS. 3A, 3B and 3C, FIGS. 4A, 4B and 4C, and FIGS. 5A, 5B and 5C, are side, top and cross-sectional views of four frame members in accordance with the invention.
Figure 2B:
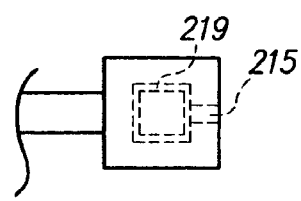
Figure 2C:
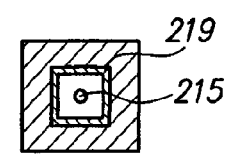
Figure 5A:
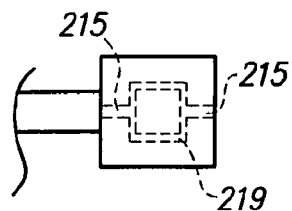
Figure 5B:
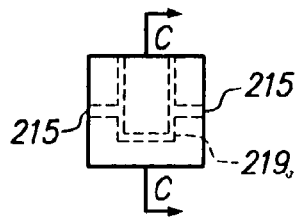
Figure 5C:
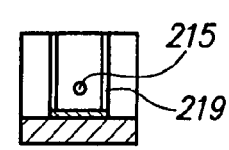
Figure 6:
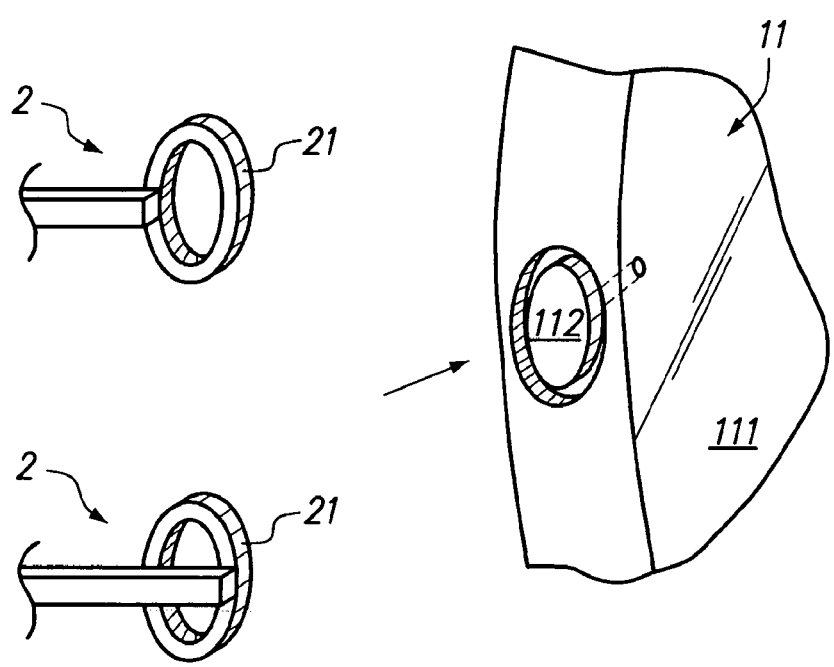

Referring now to the drawings, in which the same reference numerals are used to denote the same or similar components, FIGS. 1 and 6 are partial perspective views of a lens 11 having a body portion 111 and an engaging portion 112, and a frame member 2 having a terminal portion 21 which fits over the engaging portion 112. At least part of the to-be-contacted surfaces of the engaging portion 112 and/or of the terminal portion 21 is coated with an adhesive, which is shown in FIG. 1 as layer 219, but is not shown in FIG. 5. In FIG. 1, there is a passage 215 in the terminal portion, and in FIG. 6 there is a passage 115 through the lens, at least part way through which adhesive is forced when the terminal portion is fitted over the engaging portion. FIG. 2A is a side view, FIG. 2B is a top view, and FIG. 2C is a cross-section on line CC of FIG. 2A, of the frame member 2 in FIG. 1.

Figure 3A:
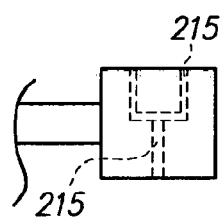
Figure 3B:
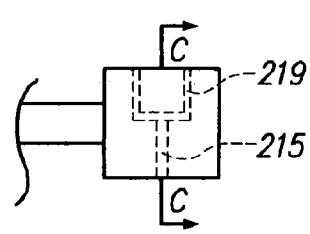
Figure 3C:
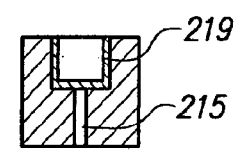

FIG. 3A is a side view, FIG. 3B is a top view, and FIG. 3C is a cross-section on line CC of FIG. 3B, of another frame member which can be fitted over engaging portion 112.

Figure 4A:
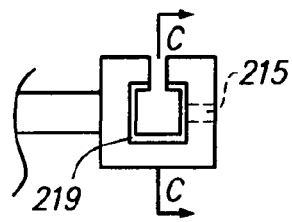
Figure 4B:
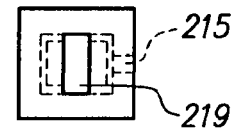
Figure 4C:
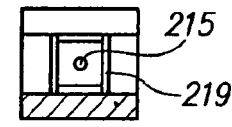

FIG. 4A is a side view, FIG. 4B is a top view, and FIG. 4C is a cross-section on line CC of FIG. 4A, of another frame member which can be fitted over engaging portion 112.

FIG. 5A is a side view, FIG. 5B is a top view, and FIG. 5C is a cross-section on line CC of FIG. 5B, of another frame member which can be fitted over engaging portion 112.

The invention claimed is:

1. An assembly comprising a frame member, an engaging portion on an eyeglass lens, and an adhesive composition which (i) provides at least part of an interface between the engaging portion and the frame member and (ii) extends at least part way into a passage which passes from the interface to an exposed face of the frame member or of the lens, the passage being free from any auxiliary member which is a screw.

2. An assembly according to claim 1 wherein the composition is a UV-cured adhesive which can be weakened by heat.

3. An assembly according to claim 1 wherein the frame member comprises a tubular portion which fits over the engaging portion.

4. A process for making an assembly which comprises, comprising a frame member, an engaging portion on an eyeglass lens, and an adhesive composition which (i) provides at least part of an interface between the engaging portion and the frame member and (ii) extends at least part way into a passage which passes from the interface to an exposed face of the frame member or of the lens, the process comprising (A) providing a frame member which has a tubular terminal portion, (B) providing an eyeglass lens having an engaging portion to which the tubular terminal portion can be fitted, (C) coating at least part of the to-be-contacted surfaces of one or both of the engaging portion and the frame member with a composition which is relatively soft when the contacting surfaces of the lens and the frame member are brought into contact;

(D) fitting the terminal portion over the engaging portion; and (E) treating the composition so that it hardens;

wherein the terminal portion comprises a passage which passes from an interface between the contacting surface of the terminal portion to an exterior surface of the terminal portion, and/or the engaging portion comprises a passage which passes from an interface between the contacting surface of the engaging portion to an exterior surface of the lens, and in step (D) the composition is forced at least part way into the passage.

5. An assembly which comprises
(1) an eyeglass lens comprising (i) a body portion having a periphery and (ii) an engaging portion which projects from the periphery,
(2) a frame member comprising a tubular portion which fits over the engaging portion,
(3) an adhesive composition which (i) provides at least part of an interface between the engaging portion and the frame member and (ii) extends at least part way into a passage which passes from the interface to an exposed face of the frame member or of the lens,
(4) an auxiliary member which is not a screw, which passes through the passage in the frame member into a recess in the lens, and which is surrounded by a composition which has been hardened around the member after the member has been placed through the passage in the frame member and into the recess in the lens.

6. An assembly according to claim 5 wherein the auxiliary member is a rod composed of a polymeric composition.

7. An assembly according to claim 5 wherein the adhesive composition (3) is a UV-cured adhesive which can be weakened by heat, and the auxiliary member is surrounded by a UV-cured adhesive which can be weakened by heat.

8. An assembly which comprises
(1) an eyeglass lens comprising (i) a body portion having a periphery and (ii) an engaging portion which projects from the periphery and which has a recess therein,
(2) a frame member comprising a tubular portion which (i) fits over the engaging portion, (ii) has a first face adjacent to the engaging portion and a second exposed face, and (iii) has a passage which passes from the first face to the second face, and
(3) an auxiliary member which is not a screw and which passes through the passage in the frame member into the recess in the engaging portion.

9. An assembly according to claim 8 wherein the auxiliary member is surrounded by a composition which has been hardened around the member after the member has been placed through the passage in the frame member and into the recess in the lens.

10. An assembly according to claim 8 wherein the auxiliary member is surrounded by a UV-cured adhesive which can be weakened by heat.

* * * * *